United States Patent [19]

Föhl

[11] 4,369,931
[45] Jan. 25, 1983

[54] REDIRECTING DEVICE FOR SAFETY BELTS

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 931,448

[22] Filed: Aug. 7, 1978

[30] Foreign Application Priority Data

Aug. 10, 1977 [DE] Fed. Rep. of Germany ....... 2736115

[51] Int. Cl.³ .................. A62B 35/00; B65H 75/48
[52] U.S. Cl. ................................ 242/107; 242/76; 280/808
[58] Field of Search ................ 242/107–107.7, 242/76; 226/190, 194; 280/806, 807, 808; 297/475–483; 254/416

[56] References Cited

U.S. PATENT DOCUMENTS

| | | | |
|---|---|---|---|
| 3,276,651 | 10/1966 | Bryer | 242/76 X |
| 3,319,998 | 5/1967 | Boland | 242/107.4 R X |
| 3,493,161 | 2/1970 | Billings et al. | 242/76 X |
| 3,528,645 | 9/1970 | Harken | 254/192 |
| 3,618,975 | 11/1971 | Bombach | 280/747 |
| 4,012,003 | 3/1977 | Cochran et al. | 242/76 X |

Primary Examiner—John M. Jillions
Attorney, Agent, or Firm—Herbert L. Lerner

[57] ABSTRACT

A redirecting device for a safety belt for use in motor vehicles, in which one end is rolled up on an automatic winder and the other end of the safety belt has a fitting for connecting the belt to a lock. The redirecting member is a hollow rotatable cylindrical member, wider than the belt, mounted on an axle supported by the legs of a bracket. Roll elements are disposed at the ends of the rotatable member to support it and permit it to rotate freely. Additional roll elements which project beyond both sides of the wall of the rotatable member are disposed in the central region of the rotatable member. This has the advantage of a smaller ratio of retraction force to pull-out force of the belt.

5 Claims, 7 Drawing Figures

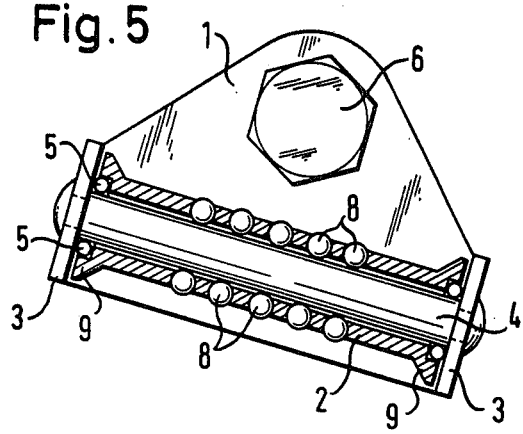
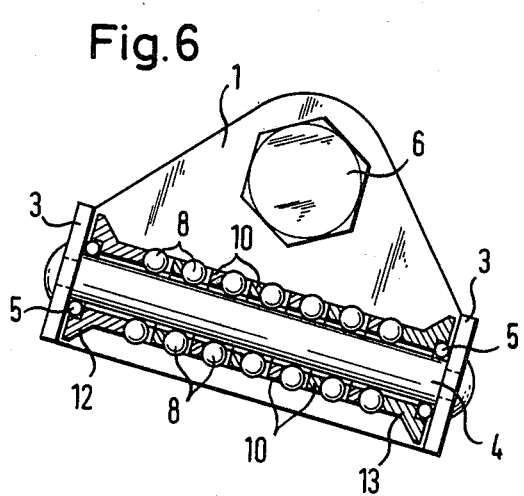
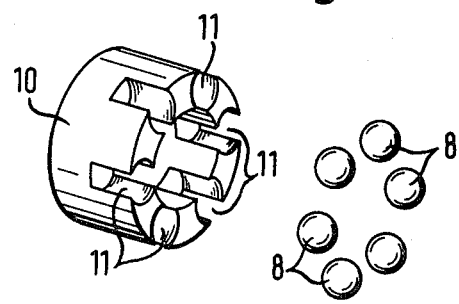

REDIRECTING DEVICE FOR SAFETY BELTS

BACKGROUND OF THE INVENTION

1. Field of the Invention

The invention relates to a reversing member or redirecting device for a safety belt adapted for use in motor vehicle, in which the belt is rolled up at one end zone on an automatic winder, and the other end of the belt has a fitting for connecting the belt to a lock.

2. Description of the Prior Art

In known safety belt arrangements, the belt is led in the redirecting region over a fitting which is hinged fastened to the motor vehicle body and has a steel part designed in the manner of a chain link with a straight flank, over which the belt is led.

Depending on the quality of the sliding surface of this flank and on the deflection angle, different values of the friction resistance occur at the deflection fitting, which can assume particularly high values of friction resistance if the belt runs at the edge of the fitting.

According to regulations, the automatic winder must have a minimum retraction force of 2 N. In the known winders, the ratio of the retraction force to the pull-out force is about 1:8. However, it is desirable to make this ratio as small as possible. Heretofore, it has been attempted to solve this problem by design measures in the automatic winder itself, for instance, by additional counter springs.

Intensive investigations of the whole problem area have shown, however, that not only the technical conditions in the automatic winder, but also to a large extent the friction conditions in the redirection region of the belt have a considerable effect on the ratio of the pull-out force to the retraction force.

SUMMARY OF THE INVENTION

It is therefore an object of the present invention to provide a redirection device for a safety belt with a small ratio of retraction force to the pull-out force.

With the foregoing and other objects in view, there is provided in accordance with the invention a redirecting device for a safety belt in which one end of the safety belt is rolled up on an automatic winder in an end region and the other end of the safety belt has a fitting for connecting the belt to a lock, a redirecting member supported in the redirecting device, over which member the belt passing in contact with the redirecting member is led in the redirection region, the redirecting member including in the contact zone of the belt a rotatable member around which the belt is partially looped, with the rotatable member of width greater than the width of the belt to extend beyond the belt on both sides, and roll elements supporting the rotatable member to permit the rotatable member to rotate freely.

In one embodiment of the invention the rotatable member is a hollow cylinder in the middle region, and has conical reinforcements in its end regions.

In another embodiment additional roll elements are disposed in the central region of the rotatable member which project beyond the wall of the rotatable member on both sides of the wall.

Other features which are considered as characteristic for the invention are set forth in the appended claims.

Although the invention is illustrated and described herein as embodied in redirecting device for safety belts, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 5 shows a redirecting fitting of the type shown in FIG. 3, with a rotatable member conically enlarged in the end region, FIG. 6 is a redirecting fitting according to the illustration in FIG. 5, in which the rotatable member is subdivided into several sections each forming a roll element cage, and FIG. 7 is a perspective view of a rotatable member section according to FIG. 6.

DETAILED DESCRIPTION OF THE INVENTION

Figure 1:
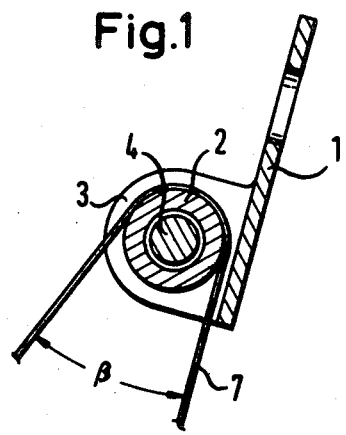
FIG. 1 shows a redirecting fitting in accordance with the present invention with a rotatable member surrounding the axle in cross-section.

In accordance with the invention, the redirecting device comprises in the contact area of the belt a rotatable member which is supported, freely moving, by roll or antifriction elements. The belt is partially looped around the rotatable member which is wider than the belt on both sides, i.e. each side of the belt does not normally extend to each adjacent end of the rotatable member. The rotatable body is preferably supported by roll elements in the radial and axial directions relative to its axis of rotation. This support can be achieved in a particularly simple design by roll elements arranged in the lateral end regions of the rotatable member.

Thus, in accordance with the invention, the friction of the belt in the redirection region is reduced considerably and thereby, the negative influence on the tension conditions in automatic winders is decreased. The rotatable member is preferably designed within its center area as a hollow cylinder and with conical reinforcements in its end region. The belt is held in the central region of the rotating member by the conical reinforcements in case of extreme redirection angles. This effect can be further improved by a smooth surface of the rotatable member or by knub-like or spherical rises or protuberances.

In one preferred embodiment, the roll elements are arranged in the central region of the rotatable member in such a manner that they extend beyond the walls of the latter on both sides.

From a manufacturing point of view, special advantages are obtained if the rotatable member is subdivided into several sections, each forming a roll element cage. The cage chambers, each of which contains a roll element, are open at one end face of the rotatable member sections, so that the roll elements can be inserted from an end face of the rotatable member section when the redirecting device is being assembled.

The rotatable member and/or the roll elements preferably consist of, i.e. are formed from plastic material with adequate strength values.

According to a further embodiment of the invention, the redirecting device has a bracket formed from flat stock with leg ends which support a support axle on which is mounted the rotatable member. The edges of the leg ends of the bracket are bent outwardly in order to avoid damage to the belt when under load.

The bracket designed according to the invention is hinge fastened to part of the vehicle body, like the known redirection hardware, so that the axis of the rotatable member can always automatically assume the optimum position with respect to the redirection angle.

Embodiment examples of redirecting devices designed in accordance with the invention are shown in the drawings.

Figure 2:
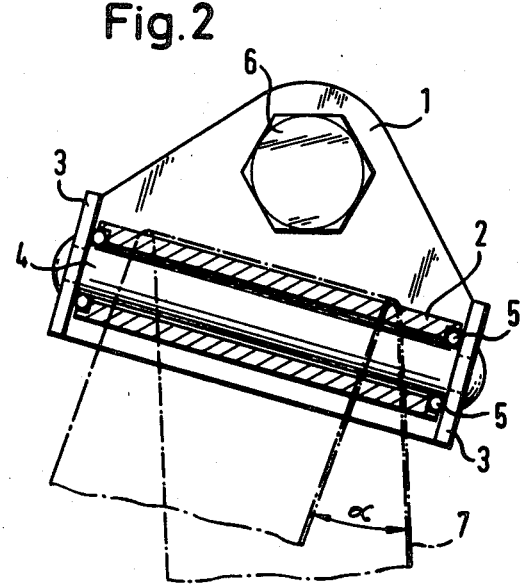
FIG. 2 is another section of the redirecting fixture of FIG. 1, showing the axle and surrounding rotatable member lengthwise.

Referring to the drawings, the redirecting fixture 1 shown in FIGS. 1 and 2 has a hollow, cylindrical rotatable member 2, mounted on an axle 4 held in the fitting legs 3 and supported radially and axially by roll (or antifriction) elements 5. The redirecting fixture 1 is mounted, hinged about the axis of the screw 6, by means of that screw at a part of the vehicle body, not shown. A safety belt 7 is partially looped around the rotatable member 2. A redirection angle α, as shown in FIG. 2, of different magnitude and a likewise variable looping angle β, as shown in FIG. 1, are obtained, depending on the conditions.

The arrangement shown of a rotatable member 2 supported in a roll element substantially reduces the friction losses of the belt 7 when it is pulled out or rewound. Additional reductions of the friction values are obtained if the surface of the rotatable member 2 is smooth, for instance a ground surface, or is provided in a manner as shown with knub-like or spherical rises.

Figure 3:
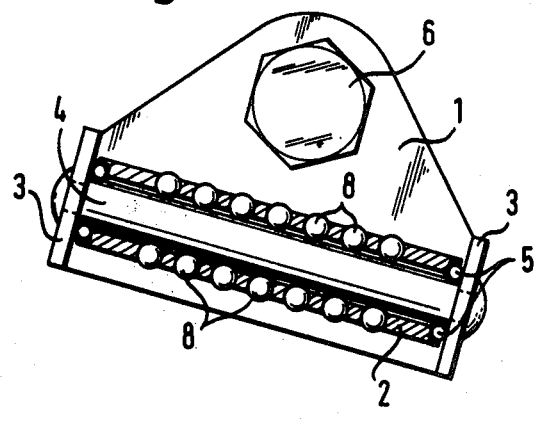
FIG. 3 is a variant of the redirecting fitting shown in FIG. 2 with roll elements in the central area of the rotatable member.
Figure 4:
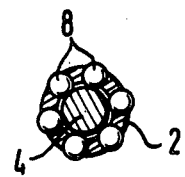
FIG. 4 is a cross-section of the axle and surrounding rotatable member and central roll elements shown in FIG. 3.

In the embodiment examples according to FIGS. 3 and 4, additional roll elements 8 are arranged in the middle region of the rotatable member 2. The roll elements 8 project beyond the wall of the rotating member 2 on both sides in such a way that the latter acts as a cage for the roll elements.

In the embodiment example according to FIG. 5, the rotatable member 2 has additional conical reinforcements 9 in its lateral end regions. By arranging the roll elements 8 according to FIGS. 3 and 4, the belt 7 is prevented to a large extent from running up onto the legs 3 of the fitting 1 and from thereby leading to increased friction losses. This possible effect is reduced still further by the conical enlargements 9 according to the embodiment example shown in FIG. 5.

In the embodiment example according to FIGS. 6 and 7, the rotatable member is subdivided in the central region into sections 10, each of which forms a cage for a set of roll elements 8, as illustrated in FIG. 7. The openings 11 for the respective roll body 8 are open at one end face of the section 10, so that the roll bodies, which preferably have the shape of a sphere, can be inserted into the cage laterally. Also the end portion 12 may be designed with its open end face extending toward the center. The end portion 13 need not have a cage function.

The embodiments of the invention in which an exclusive property or privilege is claimed are defined as follows:

1. A redirecting device for a safety belt in which one end of the safety belt is rolled up on an automatic winder in an end region and the other end of the safety belt has a fitting for connecting the belt to a lock, a redirecting member supported in the redirecting device, over which member the belt passing in contact with the redirecting member is led in the redirection region, the redirecting member comprising in the contact zone of the belt a rotatable member having a wall as the outer surface around which the belt is partially looped, with the rotatable member of width greater than the width of the belt to extend beyond the belt on both sides, and roll elements supporting the rotatable member to permit the rotatable member to rotate freely, and wherein additional roll elements are disposed in the central region of the rotatable member which project beyond the wall of the rotatable member on both sides of the wall.

2. Redirecting device according to claim 1, wherein the rotatable member is subdivided into several sections, and each section forms a cage chamber for roll elements.

3. Redirecting device according to claim 2, wherein the cage chambers are open at one end face of the rotatable member sections for receiving a roll element.

4. Redirecting device according to claim 1, wherein the rotatable member or its sections consist of plastic material.

5. Redirecting device according to claim 1, wherein a bracket formed of flat stock, has leg ends supporting a support axle on which is mounted the rotatable member.

* * * * *